United States Patent [19]

Lomaga

[11] 4,196,927
[45] Apr. 8, 1980

[54] GUTTER CLEARING DEVICE

[76] Inventor: Moroslaw Lomaga, Grandview Ter., Brooklyn, Conn. 06234

[21] Appl. No.: 931,454

[22] Filed: Aug. 7, 1978

[51] Int. Cl.² .......................... B25J 1/02; E04D 13/06
[52] U.S. Cl. .................................................. 294/19 R
[58] Field of Search .................. 294/19 R, 22, 23, 50, 294/8, 11, 30, 106; 56/333, 332

[56] References Cited

U.S. PATENT DOCUMENTS

| | | | |
|---|---|---|---|
| 3,743,339 | 7/1973 | Brackett | 294/19 R |
| 3,858,267 | 1/1975 | Swannie | 294/19 R |
| 4,114,938 | 9/1978 | Strader | 294/19 R |

Primary Examiner—James B. Marbert

[57] ABSTRACT

A gutter clearing device for removing leaves and other debris accumulated in the rain gutters of a building. The device includes an elongated handle that enables the user of the device to stand at ground level and remove debris from elevated gutters. One end of the handle is pivotally mounted to the upper portion of an elongated frame to allow angular adjustment of the frame with respect to the handle. A pincer mechanism for releasably grasping debris from a gutter is mounted on the frame and may be guided by the user into the gutter.

6 Claims, 3 Drawing Figures

GUTTER CLEARING DEVICE

BACKGROUND OF THE INVENTION (1) Field of the Invention

The present invention relates to gutter clearers and more particularly to the type of gutter clearers that are hand held and operated by an individual from ground level.

(2) Prior Art

It has been found necessary to clean leaves and other debris from rain gutters of buildings. Should the debris not be cleared from the gutters, the gutters will not function to remove rain falling upon the roof and to direct the accumulated water to desired areas. The current method of clearing gutters is for a person to climb to the roof of a house and sweep the gutters clean with an ordinary broom. This method of cleaning the gutters has been found to be awkward and/or dangerous. The individual cleaning the gutter performs the task while standing on a ladder or the roof.

Many attempts have been made to provide gutter clearers that can be operated by an individual from the ground in order to avoid the necessity of working in a dangerous position. U.S. Pat. No. 3,972,552 discloses a gutter clearer having two jaws which are urged in the open position by a spring and which are closed by pulling the jaws together with a cable. The jaws include a series of elongated spikes which extend from the jaws and which engage the debris. A problem with the device disclosed in this patent is that the teeth tend to pierce and engage the debris and make it difficult to remove the debris from the spikes whereby the debris could not be removed without lowering the device to the ground.

U.S. Pat. No. 2,896,239 discloses a gutter clearing apparatus which includes an elongated handle for operation by an individual from the ground. At one end of the handle there is included a conventional broom which is used to sweep the gutter. However, with this device, the leaves are not grasped and removed from the gutter and cannot be removed if wet, but rather, are swept out of the gutter.

U.S. Pat. No. 2,720,409 discloses a gutter clearer which includes a pair of tong elements which are cammed open by a roller. The roller is operated by a lever rotatably fixed to the tong elements. The gutter clearer is complicated and requires many moving parts.

During the use of the aforementioned prior art devices, it has been found that the devices are difficult to use when obstructions such as shrubs or secondary lower roofs are positioned between the wall of the house and the individual wishing to clean the gutter directly above the obstruction.

Thus, it is one object of the invention to provide a simple gutter clearing device which allows for removal of debris from a rain gutter.

It is another object of the present invention to provide a gutter clearing device which is of simplified construction.

It is another object of the present invention to provide a gutter clearing device which allows for operation by an individual from the ground below the gutters.

It is another object of the present invention to provide a gutter clearing device which allows for the gutters to be cleared despite obstructions such as bushes or the like positioned near the wall of the building directly below the gutter to be cleaned.

SUMMARY OF THE INVENTION

The present invention provides a gutter clearing device for removing leaves and other debris accumulated in the rain gutters of a building. The device includes an elongated handle that enables the user of the device to stand at ground level and remove debris from elevated gutters. One end of the handle is pivotally mounted to the upper portion of an elongated frame to allow angular adjustment of the frame with respect to the handle. A pincer mechanism for releasably grasping debris from a gutter is mounted on the frame and may be guided by the user into the gutter.

Moreover, to allow cleaning of the gutters despite obstructions such as bushes located near the wall below the gutter to be cleaned, the present invention allows for adjustable angular positioning of the elongated handle with respect to the frame. The handle is rotatably jointed at one end of the frame, and, at a position on the handle spaced from the handle-frame joint, there is provided an adjustable securement rod support which spans the angular separation between the handle and the frame and which allows for the selection of a particular angle between the handle and the frame.

DETAILED DESCRIPTION OF THE INVENTION

Figure 1:
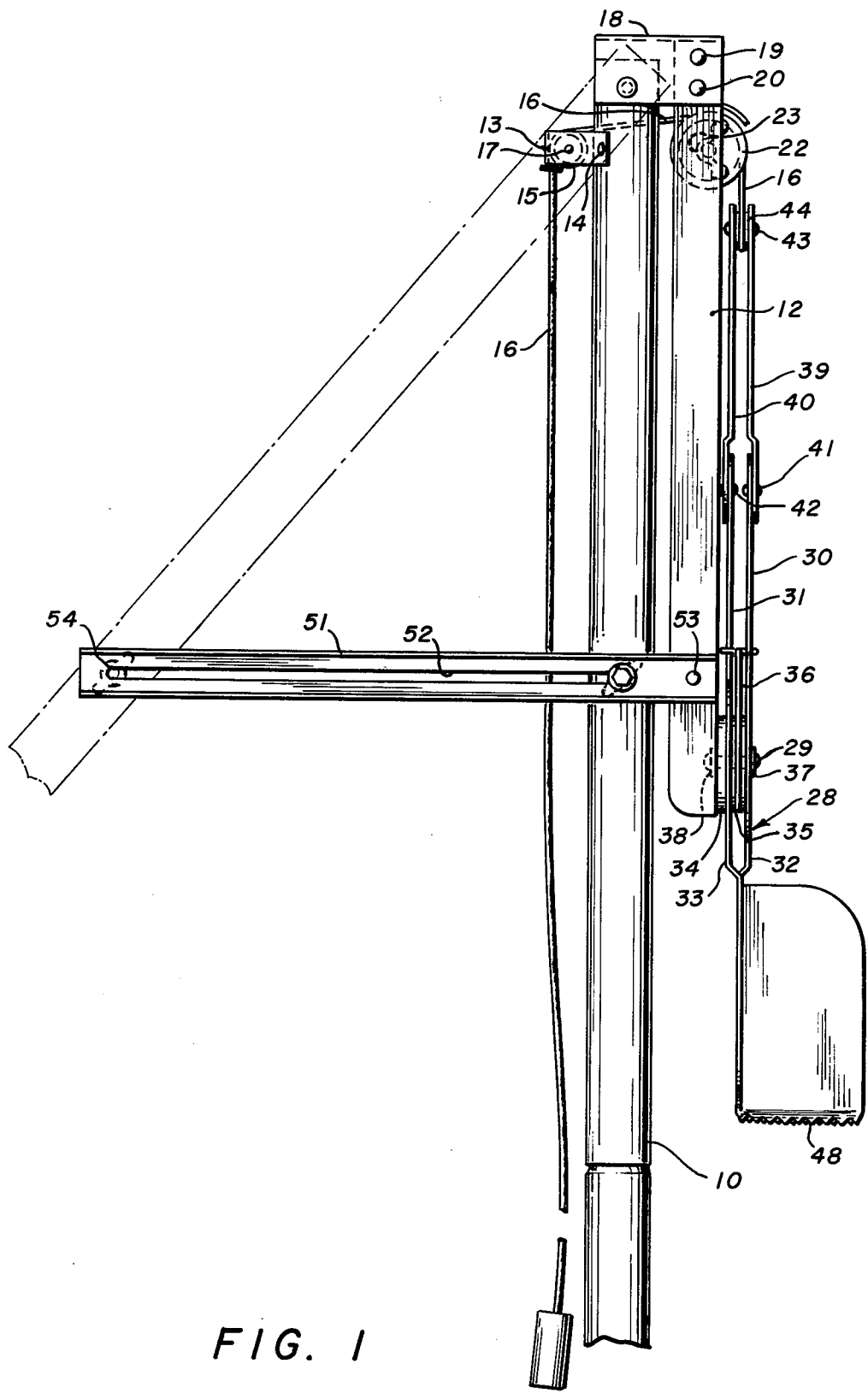
FIG. 1 is a side elevational view of the gutter clearing device.
Figure 2:
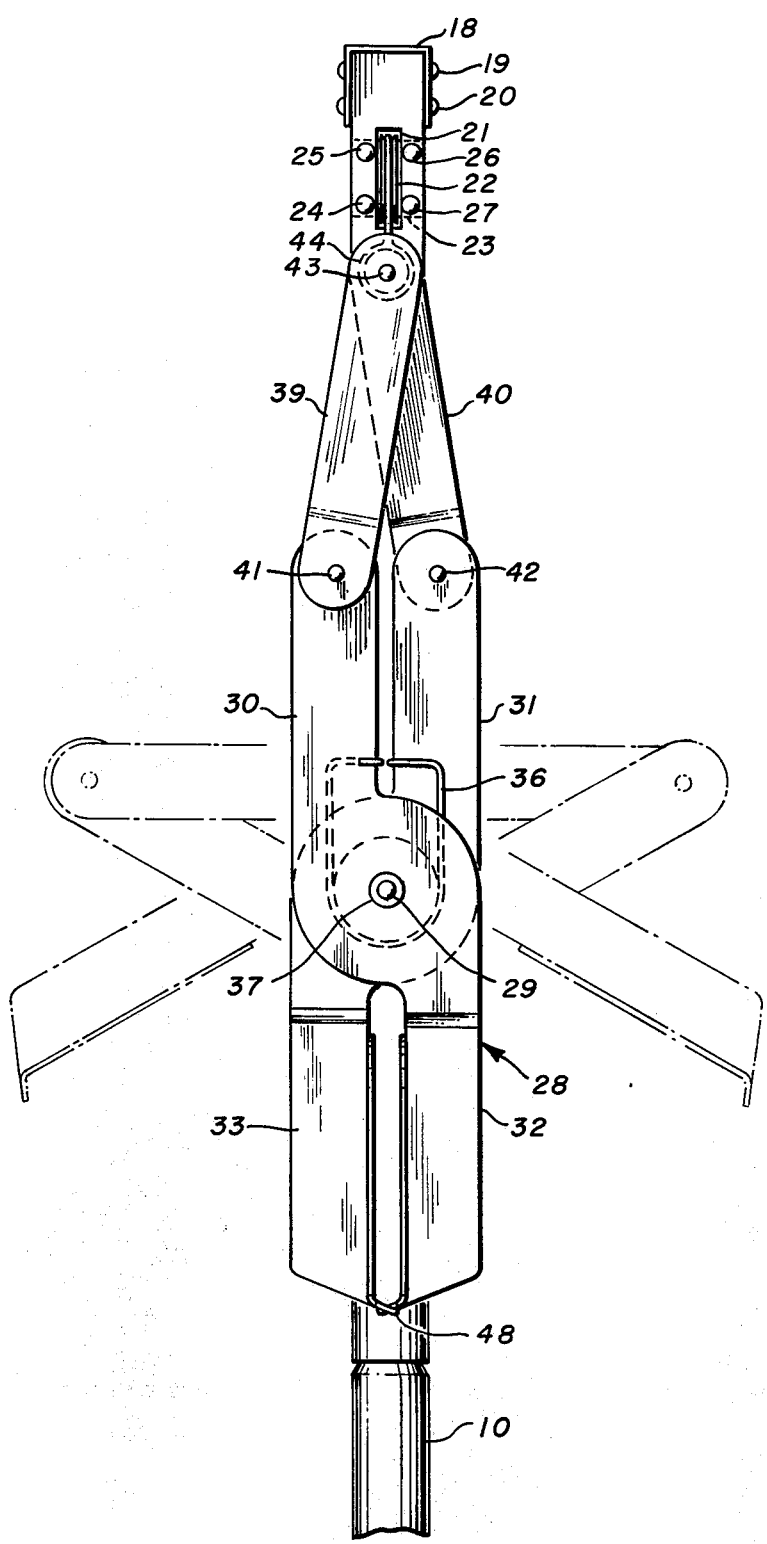
FIG. 2 is a front elevational view of the gutter clearing device as viewed from the right side of FIG. 1.

Referring to FIGS. 1 and 2, the gutter clearing device includes an elongated handle 10 which includes one end (not shown) which is held by the person on the ground operating the device and includes another end which is rotatably mounted to frame 12 by a rivet. Preferably, the handle is made of lightweight aluminum tubing having a 1 inch outer diameter and a 0.025 wall thickness. It should be understood that the handle can be a single piece of aluminum tubing, plurality of tubes joined by conventional joints, or a set of telescoping tubes. A pulley support bracket 13 is riveted to the handle by rivet 14 at a point adjacent to the connection between the handle 10 and the frame 12. The pulley support bracket 13 engages pulley 15 which serves to guide cable 16. Pulley 15 is supported within pulley support bracket 13 by shoulder rivet 17. The top bracket 18 of frame 12 is U-shaped and is affixed to the frame by shoulder rivets 19 and 20. Frame 12 is preferably made from aluminum. The upper region of frame 12 includes a hole 21 which allows for the positioning of a pulley 22 therein. Pulley 22 is attached to the interior surface of frame 12 by a bearing bracket 23 which is affixed to frame 12 by four rivets 24, 25, 26 and 27.

Referring to FIG. 1, the angular position of handle 10 can be adjusted with respect to frame 12 by an elongated U-shaped bracket 51 having a longitudinal slot 52 therein. Bracket 51 is rotatably mounted on frame 12 by pin 53. Screw 54 mounted on handle 10 fits through slot 52 and releasably engages bracket 51. Thus, the angular position of handle 10 can be adjusted with respect to frame 12 to allow the person operating the gutter clearing device to clean gutter despite shrubs or other obstructions that may be adjacent a building.

A pincer mechanism shown at reference character 28 is mounted on frame 12 by rivet 29. Pincer mechanism 28 includes two lever arms 30 and 31 which are rotatably mounted with respect to frame 12 by rivet 29. Lever arms 30 and 31 include respectively jaws 32 and 33. When the lever arms 30 and 31 are positioned together, jaws 32 and 33 are in the closed position as shown in the solid lines of FIG. 2. When the lever arms are separated as shown in the broken lines of FIG. 2, the jaws 32 and 33 are opened.

In order to allow movement of lever arms 30 and 31 with respect to frame 12, a nylon spacer 34 is provided between lever arm 31 and frame 12. Also axially disposed with respect to rivot 29 is a second spacer 35 which is also preferably made out of nylon and which separates lever arm 30 from lever arm 31. This grooved nylon spacer 35 provides for securement of U-shaped spring 36 which urges lever arms 30 and 31 and jaws 32 and 33 in the opened position. Rivet 29 is provided with two washers 37 and 38.

The manner by which lever arms 30 and 31 are opened and closed is a particularly novel aspect of the present invention. Each end of lever arms 30 and 31 is attached respectively to control arms 39 and 40 by rivets 41 and 42. The two control arms are rotatably fixed to one another by rivet 43. Positioned axially on rivot 43 is a nylon bushing 44 which allows for generally free rotation of arm 39 with respect to control arm 40.

One end of cable 6 is attached to nylon bushing 44 and then positioned on guide pulleys 22 and 15. The other end of cable 6 is held by an individual operating the gutter clearing device. As shown in FIGS. 1 and 2 when the cable 6 is pulled downwardly by an individual operating the device, control arms 39 and 40 move upwardly and in turn close lever arms 30 and 31. The closing of lever arms 30 and 31 causes the closing of jaws 32 and 33. If the cable is released, and allowed to move upwardly, control arms 39 and 40 move downwardly as urged by the force of spring 36 thereby opening jaws 32 and 33.

Figure 3:
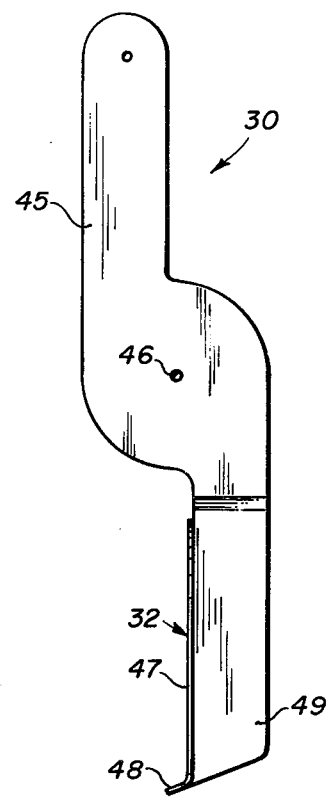
FIG. 3 shows a front view of a lever arm of the gutter clearing device.

As best shown in FIG. 3, lever arm 31 comprises a lever portion 45 integral with jaw 32. Hole 46 engages rivet 29. Jaw 32 is provided with and includes a debris grasping portion 47 which terminates in inwardly directed teeth 48. Debris grasping portion 47 is supported rigidly by flange 49.

While preferred embodiments have been shown and described, various modifications and substitutions may be made thereto without departing from the spirit and scope of the invention. Accordingly, it is to be understood that the present invention has been described by way of illustration and not limitation.

What is claimed is:
1. A gutter clearing device for removing debris from gutters, the gutter clearing device comprising:
   elongated handle means;
   frame means, said frame means being pivotally supported on said handle means adjacent a first end of said handle means;
   a pincer mechanism mounted on said frame means, said pincer mechanism comprising two lever arms, each of said lever arms including a jaw at one end thereof, said lever arms being rotatably mounted with respect to each other and with respect to said frame means;
   elongated cable means, said cable means being engaged by said frame means whereby said cable means can move relative to said frame means; and
   control arm means, said control arm means including two control arms mounted for rotation with respect to each other about a first common pivot, said first pivot intersecting said control arms adjacent first ends thereof, each of said control arms being mounted rotatably at its other end to one of said lever arms of said pincer mechanism, said first common pivot being affixed to said cable means whereby movement of said cable means with respect to said frame means will impart movement to said control arm means to provide for opening of the jaws when the cable means is moved in one direction and to provide for closing of the jaws when the cable means is moved in an opposite direction.

2. A gutter clearing device according to claim 1 wherein said pincer mechanism further includes a spring which urges the lever arms and the jaws to the open position.

3. A gutter clearing device according to claim 2 and further including means for adjusting the angle of the handle means with respect to the frame means.

4. A gutter clearing device according to claim 3 wherein said cable means includes a first pulley mounted at the said first end of said handle means and a second pulley mounted on said frame means, said cable means further including a cable which is engaged by said pulleys whereby said cable may move said first common pivot upwardly and downwardly with respect to the mounting point of said second pulley on said frame means.

5. A gutter clearing device according to claim 4 wherein each lever arm is mounted to rotate about a second common pivot and wherein the said one ends of the lever arms transcribe an arcuate path during such rotation.

6. A gutter clearing device according to claim 5 wherein the jaws are each provided with a debris grasping flange, said flange terminating in a serrated edge.

* * * * *